3,549,499
ASYMMETRIC REDUCTION OF SECO-STEROIDS
George Greenspan, Narberth, and George C. Buzby, Jr., Philadelphia, Pa., assignors to American Home Products Corporation, New York, N.Y., a corporation of Delaware
No Drawing. Filed Apr. 30, 1968, Ser. No. 725,509
Int. Cl. C07c 67/00
U.S. Cl. 195—51                    1 Claim

ABSTRACT OF THE DISCLOSURE

Optically active seco-steroids are prepared by microbiological reduction. The compounds are useful in the production of physiologically active steroids.

BACKGROUND OF THE INVENTION

Steroids produced by total synthesis from relatively simple chemical compounds, as taught, for example, by Smith et al., "Totally Synthetic Steroid Hormones, Part II," J. Chem. Soc. (1964), pp. 4472–4492, result in the formation of racemates. Using a convention approved by Fieser and Fieser, "Steroids," p. 336 (1959), the compounds designated as the d-forms are the enantiomers corresponding in configuration at C–13 to that of the natural hormone estrone. The corresponding enantiomorphs are consequently designated the l-forms and the racemates the dl-forms.

Since hormonal effects deemed of value have been assigned essentially to the d- series, procedures directed to the formation of such compounds would be of interest. It is obvious that this problem could be attacked by the preparation of the d-form of one of the intermediates which would result in the d-form of a complete hormonal steroid.

Along the latter lines, Gibian et al. describe the formation of optically active seco-steroids by a microbiological process using a yeast of the genus Saccharomyces in Tetrahedron Letters No. 21, pp. 2321–2330 (1966). The same biological genus is also mentioned, and for the same purpose, by Rufer et al. in Liebigs Ann. Chem. 702, pp. 141–148 (1967).

The invention relates to optically active seco-steroids and particularly to the use of specific microorganisms for obtaining them.

The process broadly involves the fermentative reduction of selected seco-steroids using specific microorganisms of the genera Cryptococcus, Rhodotorula, and Torulopsis. More specifically, the organisms used are strains identified as *Cryptococcus laurentii*, QM–8412 (formerly classified as *Rhodotorula aurea*), *Rhodotorula glutinis*, ATCC 10,788, and *Torulopsis utilis*, NRRL Y–900 or enzymatic preparations thereof.

The compounds acting as substrates are seco-steroids which may be illustrated by the formula:

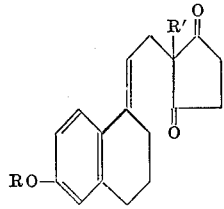

wherein R and R' each represent alkyl radicals. These compounds are known and described, for example, in Smith's British Pat. No. 1,041,273, the complete specification published Sept. 1, 1966.

In accordance with the present invention, it has bee found that microorganisms or enzymes produced ther from of Rhodotorula, Cryptococcus, or Torulopsis a capable of reducing the seco-steroids described above optically active compounds and particularly to valuab d-17β-hydroxy seco-steroids.

The compounds resulting from the reduction step a highly useful intermediates for the preparation of optical active steroids of the type described in the aforeme tioned publications of Gibian et al. and Rufer et a Steroids having an aromatic A-ring as produced fro these intermediates are hormonally active estrogens ar useful, for example, in the reduction of hyperlipemia warm-blooded animals.

Reverting to the process of the invention, it is carrie out by first cultivating the selected microorganism typical growth media comprising assimilable carbon, pre erably a carbohydrate such as dextrose, a source of nitr gen, preferably organic nitrogen such as proteinaceoi substances, for example, corn steep liquor and pepton and trace inorganic salts and water.

Following the incubation of the microorganism to tl extent desired, the selected seco-steroid substrate is adde preferably in a solvent, under sterile and aerobic co ditions. A suitable antifoam agent is helpful and m also be present. Agitation is carried out with the ter perature being maintained in the range of 25° to 37° ( for a period of time sufficient to effect the desired tran formation or biochemical conversion of the seco-stero to the optically active compound.

On termination of the microbiological reduction, tl fermentation broth is extracted with a suitable solver for example, ethyl acetate or methyl isobutyl keton and the extracts so obtained are concentrated to remo the solvent, the temperature being held below 50° C. Tl desired product in the form of the d-form of 13-alkyl-17 hydroxy-8,14-secogona-1,3,5(10),9(11)-tetraen-14-one then isolated by usual techniques from the residue.

The following examples describe and illustrate vario aspects of the process in greater detail.

EXAMPLE 1

Preparation of d-3-methoxy-8,14-secoestra-1,3,5(10), 9(11)-tetraen-17β-ol-14-one An agar slant of *Rhodotorula glutinis*, ATCC 10,7: was washed with 5 ml. of distilled water, and one n of cell suspension was transferred to a 250 ml. flask co taining 50 ml. of medium of the following compositio Corn steep liquor _____ 5
Dextrose _____ 2(
Peptone _____ 2(
Distilled water to 1 l.

The flask was incubated at 28° on a rotary shak 250 r.p.m., diameter of rotation 2".

After 24 hours of growth, 10 mg. of 3-methoxy-8,1 secoestra-1,3,5(10),9(11)-tetraen-14,17-dione in 0.5 n ethanol was added to the flask which was then replac on the shaker. After 23 hours of further incubation, 5 ml. sample was taken from the flask. One ml. of meth iso-butyl ketone was added to the sample and the mixtu was equilibrated.

An aliquot of the solvent extract was spotted on a pl of silica gel F–254 (Brinkmann); the plate was run a mixture of CHCl$_3$-acetone (9:1). After drying, t plate was examined under U.V. light, 254 mµ. Two po products were noted, one with R$_f$ of the 17β-hydro derivative (d-3-methoxy-8,14-secoestra-1,3,5(10),9(11 tetraen-17β-ol-14-one), and the other with the R$_f$ of t 14α,17β-dihydroxy compound (d-3-methoxy-8,14-sec estra-1,3,5(10),9(11)-tetraene-14α,17β-diol). After he at 100° for 30 sec., the plate was sprayed with a
ion of phosphomolybdic acid (PMA) in ethanol
g./100 ml.). The color reactions with the two products
esponded to those obtained with the respective
lards.

he following example describes larger scale operation
g a 14 liter fermentor.

EXAMPLE 2 our agar slants of *Rhodotorula glutinis*, ATCC 10,788
 each washed with 5 ml. of distilled water, and the
ensions were transferred to four one liter flasks with
ml. of the medium described above. The flasks were
bated for 24 hours as noted earlier.

le contents of four flasks (800 ml.) were transferred
 14 l. fermentor containing eight l. of the inoculum
ium. Agitation was 200 r.p.m., aeration eight l. of
nin.; the temperature was 28°. Lard oil was employed
ntifoam agent.

fter 17 hours of incubation, 1.6 g. of 3-methoxy-8,14-
estra-1,3,5(10),9(11)-tetraen-14,17 - dione in 80 ml.
thanol was added to the fermentor. Agitation was in-
sed to 250 r.p.m. The tank was sampled at one and
 hours and the samples processed as in the previous
nple. At two and one-half hours, the fermentation
harvested.

le broth was extracted with six l. of ethyl acetate and
solvent was removed completely under reduced pres-
, at no time allowing the heating bath temperature to
ed 50° C. The residue was dissolved in benzene, fil-
l through a pad of silica gel to remove cellular mate-
 and the filtrate evaporated to dryness. The residue
enzene was chromatographed on silica gel (80 g.).
l acetate 12%-benzene 88% elutes d-3-methoxy-17β-
·oxy-8,14-secoestra-1,3,5(10),9(11)-tetraen - 14 - one
h after recrystallization from isopropyl ether gave a
ing range (m.r.) 112–114° C., $[\alpha]_D^{24}=-35°$ (c.=1,
ane).
terature values for this material are m.r. 112–113°
$[\alpha]_D^{25}=-37.5$ (c.=1, dioxane). No mixture melting
t depression of the above isolated fermentation prod-
vith authentic material was observed.

lso isolated from the chromatographed column by elu-
 with ethyl acetate 50%-benzene 50% was 3-methoxy-
-secoestra-1,3,5(10),9(11)-tetraene - 14α,17β - diol
h after recrystallization from ether gave an m.r. 134–
 C., $[\alpha]_D^{25}=+29°$ (c.=2, dioxane). The authentic
-steroid has m.r. 135–136° C., $[\alpha]_D^{24}=+27°$ (c.=2,
ane). No melting point depression was observed on
ixture.

EXAMPLE 3 aration of d-13β-ethyl-17β-hydroxy-3-methoxy-8,14-
 secogona-1,3,5(10),9(11)-tetraen-14-one le procedure described in Example 1 also using the
oorganism *Rhodotorula glutinis*, ATCC 10,788 was
wed in the asymmetric reduction of 13β-ethyl-3-me-
y-8,14-secogona-1,3,5(10),9(11)-tetraen - 14,17 - di- Thin layer chromatography of the solvent extract,
ined from a sample taken at 23 hours, showed a
:, polar product with the $R_f$ of the 17β-hydroxy de-
ive. The color reaction of the product to PMA was
ar to that of the standard.

EXAMPLE 4 le larger scale procedure followed was similar to that
d in Example 2. After addition of the seco-steroid
rate mentioned in Example 3, 1.6 g. of 80 ml. of
nol, the agitation was increased to 400 r.p.m. Samples
le fermentation were taken hourly for six hours, and
:ourse of the transformation was noted by TLC. The
entation was terminated after seven hours, and the
h was extracted with a total of six liters of ethyl
te.

The solvent extracts were pooled, washed with water
and NaHCO$_3$, and then dried over Na$_2$SO$_4$.

The solvent was removed in a continuous feed rotary
evaporator at temperatures below 55° C. and the residue
in benzene filtered through Grade I neutral alumina (6.0
g.). On removal of solvent the residue was recrystallized
from isopropyl ether to provide d(+)-13β-ethyl-17β-hy-
droxy-3-methoxy-8,14-secogona-1,3,5(10),9(11) - tetraen-
14-one, m.r. 87–89° C., $[\alpha]_D^{24}+10°$ (c.=2, dioxane).
Authentic material has m.r. 85–86° C., $[\alpha]_D^{20}=+14.8$
(c.=1, dioxane). No mixture melting point depression
was observed.

EXAMPLE 5

Preparation of d-3-methoxy-8,14-secoestra-1,3,5(10),9
(11)-tetraen-17β-ol-14-one Four agar slants of *Torulopsis utilis*, NRRL Y–900
were each washed with 5 ml. of distilled water and the
cell suspensions were transferred to four 1 liter flasks
each with 200 ml. of the medium utilized in Example 1.

After incubation for 24 hours at 28° C. on a rotary
shaker, 250 r.p.m., the contents of the four flasks were
transferred to a 14 liter fermentor containing 8 liters of
the above medium. The temperature of incubation was
28° C., agitation 200 r.p.m., aeration 1 liter air/liter me-
dium/min., with lard oil as antifoam agent.

Following 18 hours of growth, the substrate, 3-methoxy-
8,14-secoestra-1,3,5(10),9(11)-tetraen - 14,17 - dione, 1.6
g. dissolved in 80 ml. of ethanol, was added to the fer-
mentor. The agitation was increased to 300 r.p.m.

The course of the conversion was followed by TLC as
described in Example 1, and the fermentation was har-
vested at 48 hours. The whole broth was extracted with
4 liters of methyl isobutyl ketone and the extracts con-
centrated to dryness.

The residue was taken up in a small amount of diiso-
propyl ether and the solution was allowed to stand at
−10° for two days. Filtration of the precipitated solid
followed by recrystallization from diisopropyl ether pro-
vided the title compound, m.r. 112–114° C., $[\alpha]_D^{25}=$
−37° (c.=2, dioxane).

EXAMPLE 6

Preparation of d-13β-ethyl-3-methoxy-8,14-secogona-
1,3,5(10),9(11)-tetraen-17β-ol-14-one Three agar slants of *Torulopsis utilis*, NRRL Y–900
were each washed with 5 ml. of distilled water. The cell
suspensions from two slants were transferred to two 1 liter
flasks with 200 ml. of medium as in Example 5; one-half
of the cell suspension from third slant was transferred to
a 500 ml. flask with 100 ml. of medium.

After 18 hours of incubation under conditions similar
to those in Example 5, the contents of the three flasks
were utilized to inoculate a 14 liter fermentor with 5 liters
of the growth medium. The aeration supplied was 0.5
liter of air/liter medium/min., agitation 250 r.p.m. tem-
perature 28° C., lard oil as antifoam agent. The sub-
strate, 13-ethyl-3-methoxy-8,14-secogona-1,3,5(10),9(11)-
tetraen-14,17-dione (1 g. in 50 ml. of ethanol), was
added to the fermentor after 6 hours, and the agitation
was lowered to 200 r.p.m. Samples were taken during the
run, processed and analyzed by TLC. The fermentation
was harvested at 138 hours, and extracted with 2.8 liters
of methyl isobutyl ketone. The extracts were reduced in
volume to dryness and the crude residue chromatographed
on silica gel (60 g.). The title compound was eluted with
15% ethyl acetate-benzene and recrystallized from diiso-
propyl ether, m.r. 84–87° C., $[\alpha]_C^{25}=+12°$ (c.=1, di-
oxane). Gas liquid chromatography indicated 100%
purity.

EXAMPLE 7

Preparation of d-3-methoxy-8,14-secoestra-1,3,5(10),9
(11)-tetraen-17β-ol-14-one Three agar slants of *Cryptococcus laurentii* (*Rhodoto-*

*rula aurea*), QM 8214 were each washed with 5 ml. of the medium utilized for growth:

| | G./l. |
|---|---|
| Corn steep liquor | 20 |
| Peptone | 20 |
| Dextrose | 50 |

Distilled water, 1000 ml.

The pH was adjusted to 7.0 with 5 N NaOH before autoclaving.

The cell suspensions were transferred to three one liter flasks, each with 200 ml. of the medium described above. The flasks were incubated on a rotary shaker at 28° for 24 hours, after which the contents of the three flasks were transferred to a 14 l. fermentor containing 6 liters of the growth medium. The temperature of incubation was set at 28°, aeration at 1 liter air/liter medium/minute, and agitation at 250 r.p.m. Dow Corning Antifoam B was employed as antifoam agent.

Following 24 hours of growth, 6 g. 3-methoxy-8,14-secoestra-1,3,5(10),9(11) - tetraene-14,17-dione dissolved in 45 ml. of ethanol was added. The temperature was raised to 32°, and the agitation was increased to 300 r.p.m. Five and one-half hours after the addition of the compound, another 6 g. was added as above.

The fermentation was harvested at 49 hours and extracted with 4 liters of methyl isobutyl ketone. The combined extracts were reduced in volume to dryness and the residue recrystallized twice from diisopropyl ether to provide the title compound, m.r. 111–114° C., $$[\alpha]_D^{25} = -37.6°$$

(c.=2, dioxane). Thin layer chromatography indicates the product is homogeneous.

EXAMPLE 8

Preparation of d-13β-ethyl-3-methoxy-8,14-secogona-1,3,5(10),9(11)-tetraen-17β-ol-14-one Cell suspensions of *Cryptococcus laurentii* were prepared as in Example 7 except that the medium used was composed of:

| | G./l. |
|---|---|
| Soy digest (Difco) | 10 |
| Peptone | 20 |
| Dextrose | 20 |

Distilled water, 1000 ml.

Three one liter flasks with 200 ml. of the medium described above were inoculated with the cell suspension Incubation was carried out at 28° C. on a rotary shaker for 24 hours, after which the contents of the three flasks were transferred to a 14 liter fermentor with 6 liters of the growth medium. The temperature of incubation was increased to 32°; aeration was set at 1 liter air/liter medium minute and agitation at 250 r.p.m., with Dow Corning Antiform B as antifoam agent.

After 18 hours of growth, 3.0 g. of 13β-ethyl-3-methoxy 8,14 - secogona - 1,3,5(10),9(11)-tetraene-14,17-dione dissolved in 30 ml. of ethanol, was added. The agitation rate was increased to 300 r.p.m. A second addition of 3 g. of compound was made 24 hours later. At 43 hours the fermentation was harvested and extracted with 4 liters of isobutyl ketone.

The combined extracts were reduced in volume to dryness. The residue was taken up in diisopropyl ether filtered and reduced in volume. After a second filtration to remove cellular material the solution was allowed to stand at −10 overnight. The precipitated solid was recrystallized from the same solvent to provide the title compound, m.r. 8: 91°, $[\alpha]_D^{25} = +13°$ (c.=2, dioxane).

The invention claimed is:

1. The process comprising asymmetrically reducing 8,14-secogona-tetraene-14,17-dione having the formula:

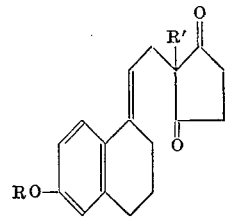

in which R and R' are lower alkyls by subjecting said compound to the reducing activity of *Torulopsis utilis* and isolating an optically active d-17β-hydroxy-8,14-secogona tetraene-14-one.

References Cited

UNITED STATES PATENTS 3,481,974   12/1969   Krachy et al. _____ 195—

ALVIN E. TANENHOLTZ, Primary Examiner